United States Patent

Terreault

[15] 3,684,976

[45] Aug. 15, 1972

[54] FREQUENCY SYNTHESIZER HAVING OUTPUT OSCILLATOR PHASE LOCKED TO FREQUENCIES DERIVED FROM A SINGLE FREQUENCY STANDARD

[72] Inventor: Gerard Linel Patrick Terreault, Granby, Quebec, Canada

[73] Assignee: General Precision Industries Limited, Montreal, Quebec, Canada

[22] Filed: Jan. 11, 1971

[21] Appl. No.: 105,493

[52] U.S. Cl. ........................331/22, 331/10, 331/25, 331/34

[51] Int. Cl. ..............................................H03b 3/04

[58] Field of Search...........331/18, 19, 22, 25, 10, 34

[56] References Cited

UNITED STATES PATENTS

| | | | |
|---|---|---|---|
| 2,751,500 | 6/1956 | Robinson | 331/22 |
| 3,372,339 | 3/1968 | Harrison et al. | 331/25 X |

*Primary Examiner*—Roy Lake
*Assistant Examiner*—Siegfried H. Grimm
*Attorney*—Alan Swabey

[57] ABSTRACT

A frequency synthesizer for producing selected frequencies to support an associated receiver. The synthesizer comprises means to generate a discrete frequency signal and generating circuit means adapted to derive from said discrete frequency signal a plurality of signals of different frequencies. A circuit means is further provided and made responsive to a selection mechanism whereby desired synthesized frequencies are rapidly selected by mixing and dividing the signals of different frequencies. A voltage controlled oscillator and phaselock means reduce the frequency selection response time to provide a substantially exact output frequency. The selection mechanism further controls the bias voltage of the voltage controlled oscillator to approximately tune it to the required output frequency.

16 Claims, 8 Drawing Figures

INVENTOR
Gerard Lionel Patrick TERREAULT

ATTORNEY

PATENTED AUG 15 1972

3,684,976

INVENTOR
Gerard Lionel Patrick TERREAULT

ATTORNEY

INVENTOR
Gerard Lionel Patrick TERREAULT

ATTORNEY

INVENTOR
Gerard Lionel Patrick TERREAULT

ATTORNEY

INVENTOR
Gerard Lionel Patrick TERREAULT
ATTORNEY

INVENTOR
Gerard Lionel Patrick TERREAULT

Alan Swabey
ATTORNEY

FREQUENCY SYNTHESIZER HAVING OUTPUT OSCILLATOR PHASE LOCKED TO FREQUENCIES DERIVED FROM A SINGLE FREQUENCY STANDARD

BACKGROUND OF THE INVENTION a. Field of the Invention

This invention relates to a frequency synthesizer adapted specifically to support a receiver and more particularly to a synthesizer in which the signal is adjustable in decade steps to provide direct reading of the frequency to which the receiver is tuned.

b. Description of Prior Art

The prior art systems for frequency synthesizers utilize voltage control oscillators, digital phase comparators, cascade multipliers and dividers for generating the required frequencies. The frequency synthesizer of the present invention is a unique design circuit arrangement and constitutes basically two parts, a frequency synthesis circuit and an output circuit. The frequency synthesis circuit generates one million possible discrete frequencies with a stability equal to that of the frequency standard. The output circuit is essentially a voltage controlled oscillator that is made to follow the steps of the frequency synthesis through a phase-lock loop.

Some of the advantages provided by the arrangement of the synthesizer of the present invention are that a locked oscillator has much less spurious content in the output than the synthesis circuit. Also, other applications where different output bands are required can be provided by altering the controlled oscillator. Further, emergency operating circuits are provided to continue the operation should partial failure occur.

SUMMARY OF INVENTION

It is an object of the present invention to provide a novel frequency synthesizer circuit incorporating the above-mentioned advantages.

According to one broad aspect, the present invention relates to a frequency synthesizer for producing selected frequencies to support an associated receiver. The synthesizer comprises means to generate a discrete frequency signal and generating circuit means to derive a plurality of signals of different frequencies, from the discrete frequency. A circuit means is responsive to a selection mechanism to rapidly select a desired synthesized frequency. A voltage controlled oscillator and phase-lock means reduce the frequency selection response time to provide a substantially exact output frequency.

BRIEF DESCRIPTION OF DRAWINGS

The invention is illustrated, by way of example, in the accompanying drawings in which.

DESCRIPTION OF PREFERRED EMBODIMENTS

Figure 1:
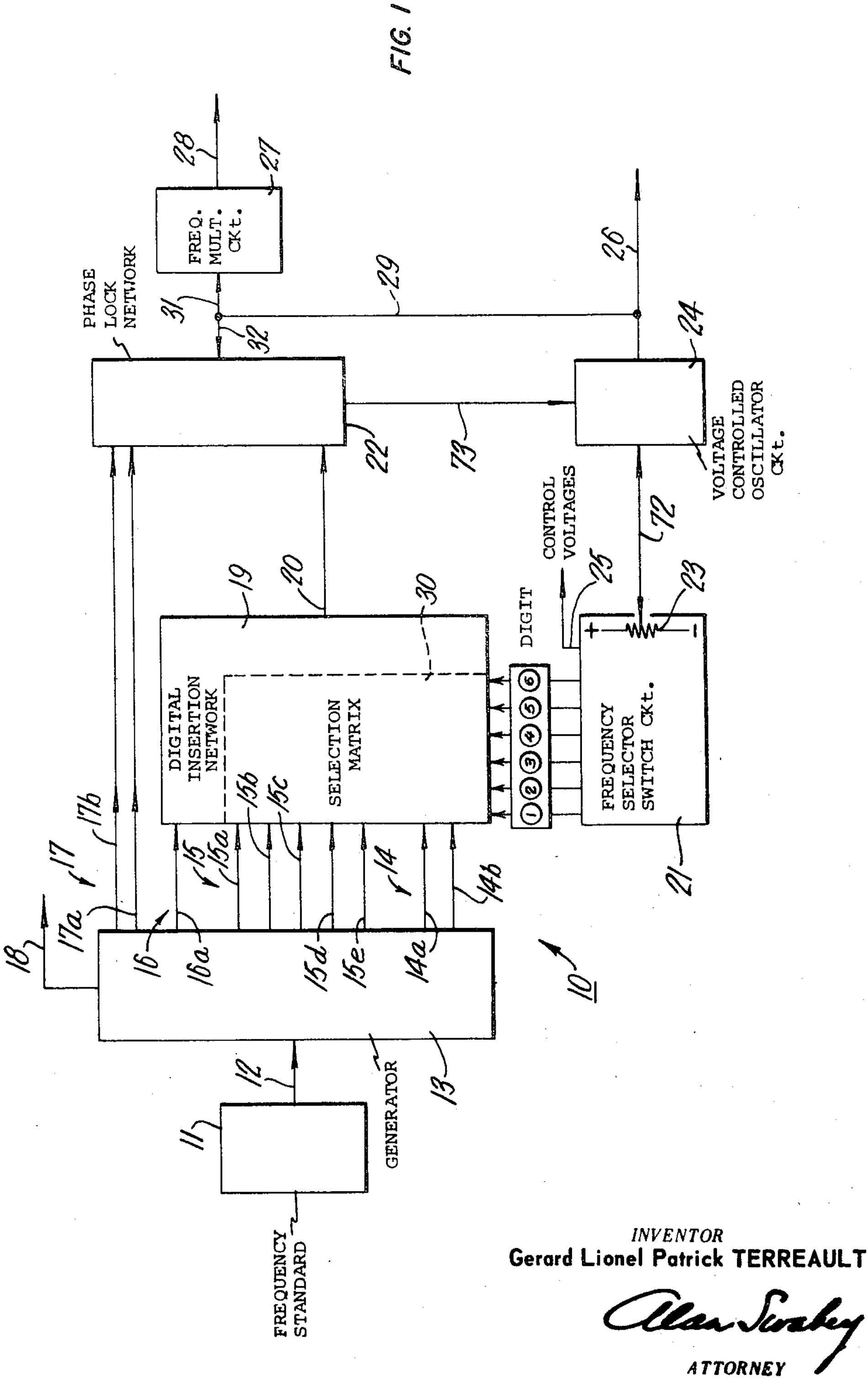
FIG. 1 is a block diagram of the frequency synthesizer of the present invention.

Referring to the drawings and more particularly to FIG. 1, there is shown a block diagram of the frequency synthesizer 10 of the present invention. The frequency synthesizer 10 comprises a frequency standard 11 producing an output signal of 1.0 MHz. This output signal is connected, via connection 12, to the input of a generator 13 of fixed frequencies which acts upon the 1.0 MHz signal to produce five output frequency groups identified by numerals 14, 15, 16, 17 and 18.

The first group 14 consists of a set of two frequencies 1.045 MHz and 1.020 MHz, for frequency synthesis, and are fed to a digital insertion network 19 via connections **14*a* and 24*b*, respectively. The second group 15 consists of a set of five frequencies 2.01 MHz, 2.02 MHz, 2.03 MHz, 2.04 MHz and 2.05 MHz also for frequency synthesis and also connected via connections 15*a*, 15*b*, 15*c*, 15*d* and 15*e*, respectively, to the digital insertion network 19. The third group 16 consists of a reference frequency output of 2.25 MHz connected to the digital insertion network 19 via connection 16*a*. The fourth group 17 consists of two frequencies of 0.90 MHz and 1.36 MHz connected to a phase-lock network 22 via connections 17*a* and 17*b* respectively. The fifth group 18 consists of an output having a set of auxiliary frequencies for 1**F conversion.

The frequencies of groups 14 and 15, for frequency synthesis, are manipulated by digital insertion network 19 to provide a selective output connection 20 of 1,000,000 (one million) evenly spaced frequencies extending from 2.25000000 MHz to 2.29999995 MHz. This manipulation is effected in a selection matrix circuit as shown by dotted lines 30. The frequency selector switch circuit 21 has a triple purpose. Firstly, it controls the operation of the digital insertion network 19 so as to determine the frequency of its output signal at its output connection 20. This output signal is fed to a phase-lock network 22. Secondly, it taps a voltage divider 23 so as to select a DC bias required for the voltage controlled oscillator circuit 24. Thirdly, it selects a pattern of control voltages and feeds them via output connection 25, for remote selection of a receiver frequency. The phase-lock network 22 connects to signals from the digital insertion network 19 and the oscillator circuit 24 and divides and mixes them so as to produce a frequency to compare with the signal from the digital insertion network 19. The frequency and phase of the voltage controlled oscillator circuit 24 is thus locked with the output frequency synthesis network 10. The oscillator circuit 24 provides an output signal 26, free from non-harmonically related components and having a choice of 1,000,000 frequencies located in the range from 11,800000 MHz to 12.799999 MHz. A DC feedback connection 73 is made between the phase-lock network 22 and the oscillator circuit 24. A frequency multiplier circuit 27 provides a further set of 1,000,000 frequencies at its output 28, which are obtained by multiplying the output of the oscillator circuit 24 by a factor of X10. The output signal 26 of the oscillator circuit 24 is tapped to provide an input to the frequency multiplier 27 and the phaselock network 22 via connection 29 which is connected to the connections 31 and 32.

Figure 2A:
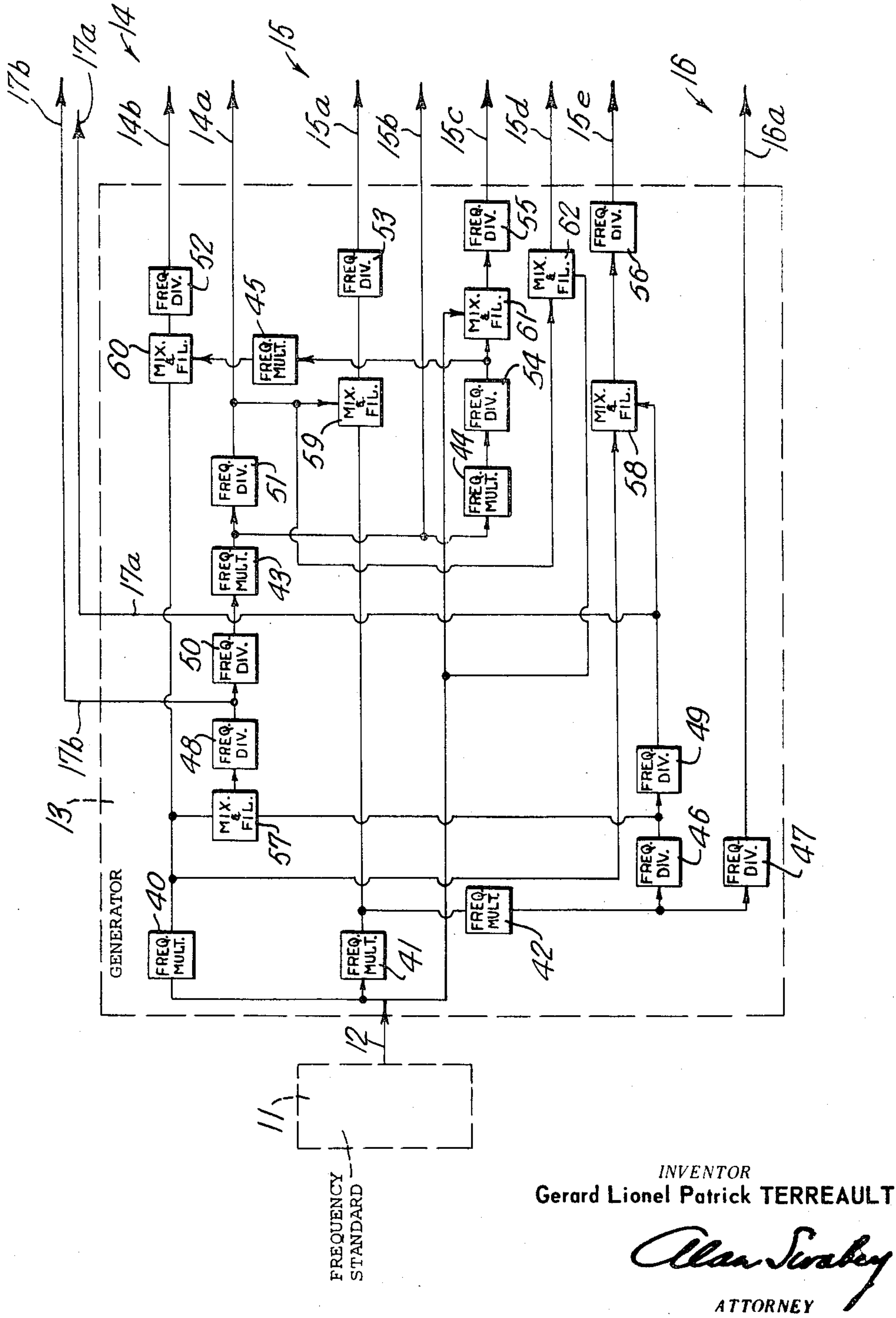
FIG. 2*a* is a detailed block diagram of a portion of the frequency synthesizer.
Figure 2B:
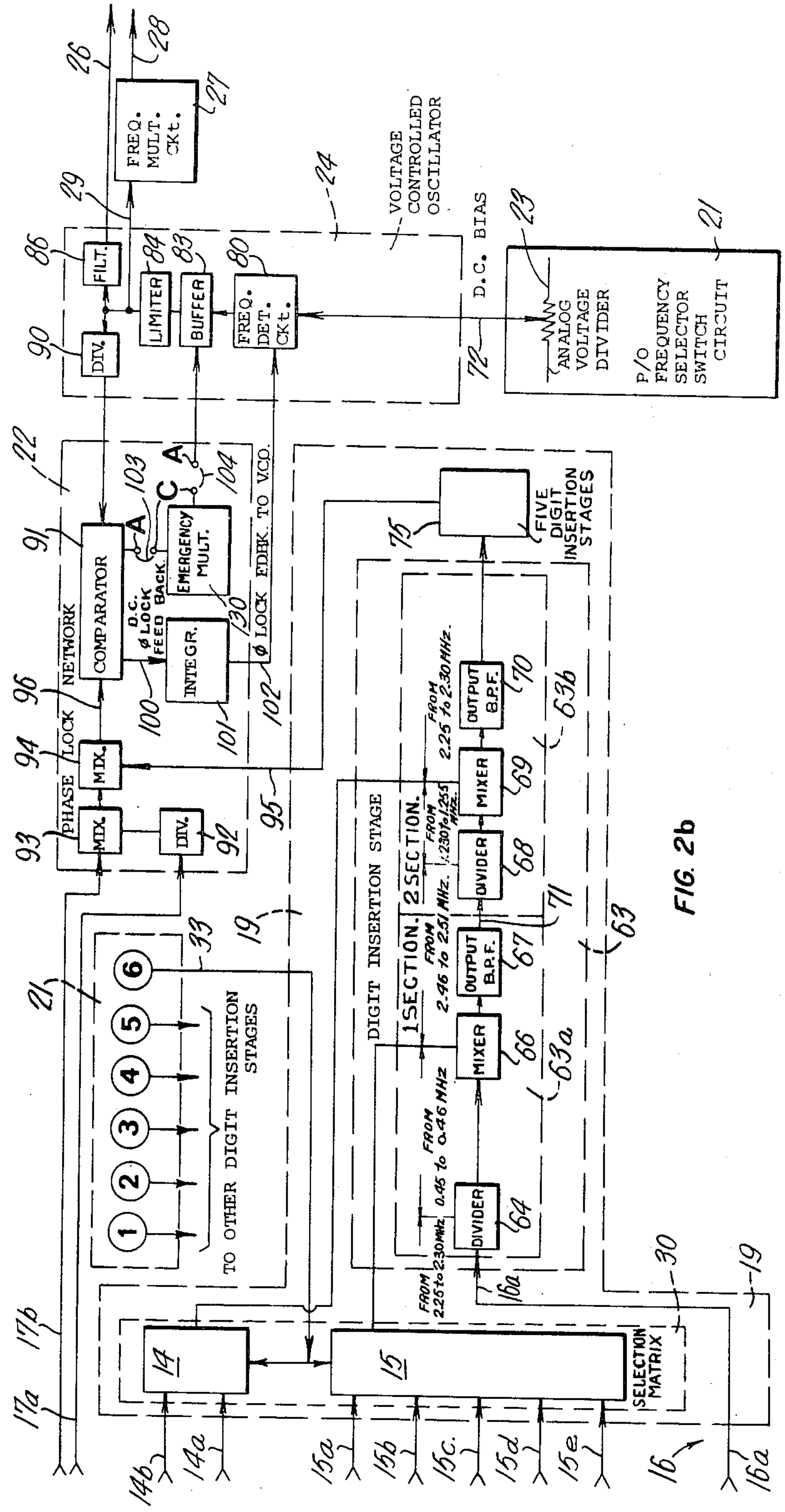
FIG. 2*b* is a detailed block diagram of a further portion of the frequency synthesizer.

Referring now to the detailed block diagram as shown in FIGS. 2*a* and 2*b*, there is shown the frequency standard 11 comprising a crystal controlled 1.0 MHz oscillator (not shown) located in a thermostatically controlled chamber. Thus, a frequency of 1.0 MHz is present at output 12 and is fed to the generator 13 of fixed frequencies where five groups or sets of frequencies are generated. The generator 13 comprises six frequency multipliers 40 to 45, eleven frequency divider stages 46 to 56, and six mixer and tuned filter circuits 57 to 62. The action of the frequency multipliers 40 to 45 consists of filtering out the required harmonics of a square wave at the input frequency. Only odd-order harmonics are used. Integrated circuits of the digital type are used in all the frequency divider stages 46 to 56. All the mixer portions of the circuits 57 to 62 are linear integrated circuits. The follow-up tuned band-pass filters of the circuits 57 to 62 are built-up of discrete miniaturized components.

As can be seen from FIG. 2*b*, frequency groups 14, 15 and 16, from the generator 13, are applied to the digital insertion network 19. This network consists of six identical two-section digit insertion stages 63, connected in series. For clarity of the drawing, only one stage 63 is shown. The first stage 63*a* is fed from the reference frequency of 2.25 MHz at output connection 16*a*. All stages are controlled by the frequency selector switch circuit 21 via the selection matrix 30 as shown by connection 33 from the selector switch 21 to the matrix 30.

Figure 7:
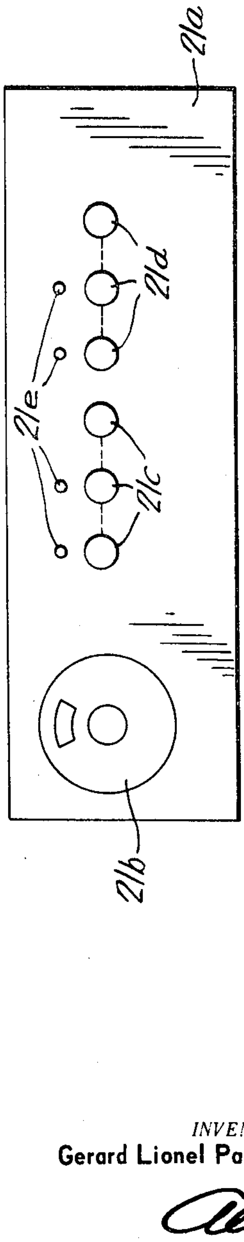
FIG. 7 is a front view of the selector switch panel showing part of the controls thereon.

For a given input frequency, each consecutive stage 63 (not shown) provides a choice of ten output frequencies, according to the position of the frequency selector switch 21. Therefore, there is a choice of ten output frequencies from the first stage 63, a choice of ten times ten output frequencies from the second stage (not shown) and so on. With the six stages 63 connected in series the ultimate choice is 1,000,000 output frequencies. The first section 63*a* of a stage 63 consists of a frequency divider 64, a mixer 66, and an output filter 67 interconnected in that order. The second section 63*b* of a stage 63 comprises a frequency divider 68, a mixer 69, and an output filter 70 interconnected in that order. The output of the filter 67 is connected to the input of the frequency divider 68 via connection 71. The mixer 66 combines the output of the divider 64 with one of the five fixed frequencies from the group 15, of the selection matrix 30. The mixer 69, combines the output of the divider 68, with one of the two fixed frequencies from group 14 of the selection matrix 30. The selection made in the first digit insertion stage 63 determines the last digit, that is, the lowest order of magnitude of the frequency ultimately synthesized. The setting of the second stage (not shown) determines the last-minus-one digit and so on. The relationship between the ten significant digits of the frequency selected and the groups 15 and 14, of five and two fixed frequencies applied to mixers 66 and 69, respectively is:

1st mixer 67, Digit 0 or 5; 1 or 6; 2 or 7; 3 or 8; 4 or 9
Freq. 2.01 MHz 2.02 MHz 2.03 MHz 2.04 MHz 2.05 MHz 2nd mixer 69 Digit 0, 1, 2, 3 or 4 5, 6, 7, 8 or 9
Freq. 1.02 MHz 1.045 MHz As can be seen from FIG. 7, the front panel 21*a* of the switch 21 has a single knob range switch 21*b* and two sets of 3 decade mechanically coupled frequency switches 21*c* and 21*d* together with four decimal point lights 21*e*. The ganged frequency switches 21*c* and 21*d* operate in such a manner that any one decade can be rotated manually and, when swung between its 0 and 9 position, it moves by one step its left hand side coupled switch which corresponds to a decade which is higher by one order of magnitude. The frequency synthesizer 10 and the associated receiver may thus be quickly tuned to a desired frequency. This frequency can be read off directly by observing the displayed digit or digits in the window of the range selector switch 21*b* and the settings of the six sections decade switches 21*c* and 21*d*. A luminous numerical frequency readout duplicating the information of the selector and switches is provided, although not shown in the drawings. The selection matrix 30 applies one of the five reference frequencies of group 15, and one of the two reference frequencies of the group 14, to the appropriate mixers 66 or 69.

The matrix 30, consists of integrated circuits (not shown) with each circuit containing a set of NAND gates. The reference frequencies selected depend on the setting of the relevant decade switch 21*c* or 21*d*. The decade switches corresponding to the digits of the highest and next-to-highest order of magnitude are wired to a resistive network consisting of voltage divider 23. The voltage divider 23 is so designed that the resultant potential can assume one of 100 possible values to provide an analogue of the first two digits of the selected frequency. This analogue potential is applied to the voltage controlled oscillator 24 via connection 72.

Figure 3:
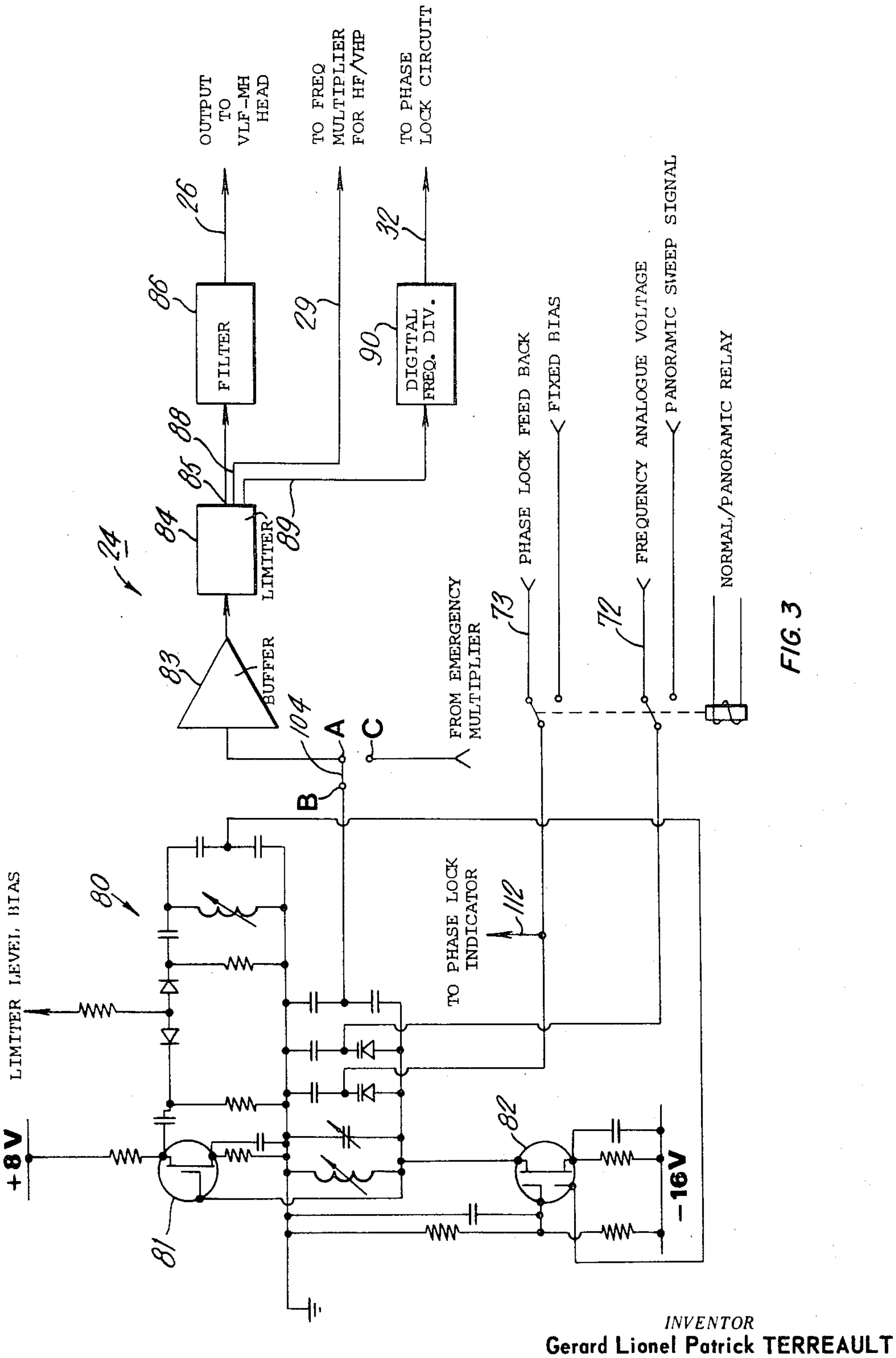
FIG. 3 is a schematic and block diagram of the voltage controlled oscillator circuit.

The voltage controlled oscillator circuit 24, as shown in FIGS. 2*b* and 3, provides the main output of the frequency synthesizer. It is phase-locked to the synthesis circuits to produce the exact frequency, in order to provide a cleaner output. The frequency determining circuit 80 of the oscillator circuit 24 uses varactors 81 and 82 to vary the frequency. Varactor 81 has a large capacitance and is used for rough tuning in 100 steps. The bias applied to varactor 81 is supplied by the analogue voltage divider 23 in the frequency selector circuit 21. The other varactor has a smaller range and is used in the feedback loop of the phase-lock network 22. The varactors 81 and 82 are operated in a bias range from 0.5 to 0.9 of the breakdown voltage, in this range the temperature co-efficient is lowest at high voltage and the Q is highest. Less gain is therefore required in the feedback loop and the oscillator has greater stability. The signal output from the frequency determining circuit 80 is connected to a buffer 83. The output from the buffer 83 is fed to a voltage squarer or limiter 84 compatible with TTL digital circuits. The squared output is tapped three ways: the first output 85 is passed through a three stage filter 86, to remove harmonic distortion and thus provide the main output 26 of the frequency synthesizer (from 11.800000 to 12.799999 MHz). The second output 88 is fed to the frequency multiplier circuit 27 through connections 29 and 31. The third output 89 is fed to a digital frequency divider 90, to feed the phase-lock circuits via connection 29 and 32.

Figure 4:
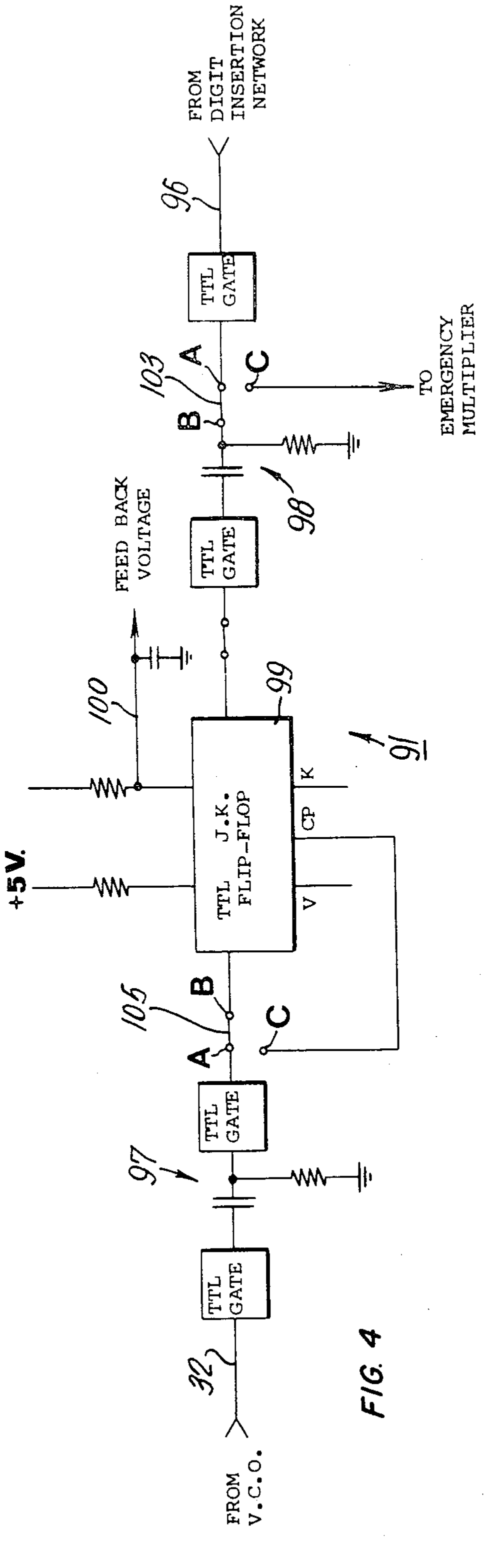
FIG. 4 is a schematic and block diagram of the comparator circuit.

Referring to FIGS. 2*b* and 4, there is shown a digital phase comparator 91 of the phase-lock network 22 which compares the synthesized frequency and the frequency from the voltage controlled oscillator 24. The 0.90 MHz frequency at connection 17*a* from the generator 13 is connected to a divider circuit 92. The 0.30 MHz frequency from the output of the divider 92 is fed to an input of a mixer circuit 93 to which the generator output frequency 1.36 MHz from connection 17*b* is also fed. A frequency of 1.66 MHz is produced at the output of mixer 93 and fed to a further mixer circuit 94 which mixes the signal with a selected signal output from 2.25 to 2.30 MHz from the output 95 via a five digit insertion stage 75, of the digital insertion network 19, to produce a signal which has a frequency located between 0.59 and 0.64 MHz. This signal is connected at 96 to the comparator 91 where it is compared with the divided output signal at connection 32 from the voltage controlled oscillator 24. Phase comparison takes place in the digital phase comparator 91. Referring to FIG. 4, there is shown that both comparator inputs 96 and 32 are fed through a differentiator and gate circuit 97 and 98 to provide 20 nanosec duration negative pulses. The two trains of pulses are applied to the direct-set and direct-reset input of a J.K. flip flop 99. The ON-OFF duty factor of one of the outputs is then proportional to the phase shift between the input pulses. The output 100 of the flip flop 99 is fed to an integrator 101 where the voltage is integrated to provide a DC potential proportional to the phase input, that is, a phase-lock feedback voltage at output 102. The locking time of this loop is less than 5 msec within a locking range of 200 kHz at the voltage controlled oscillator 24.

Figure 5:
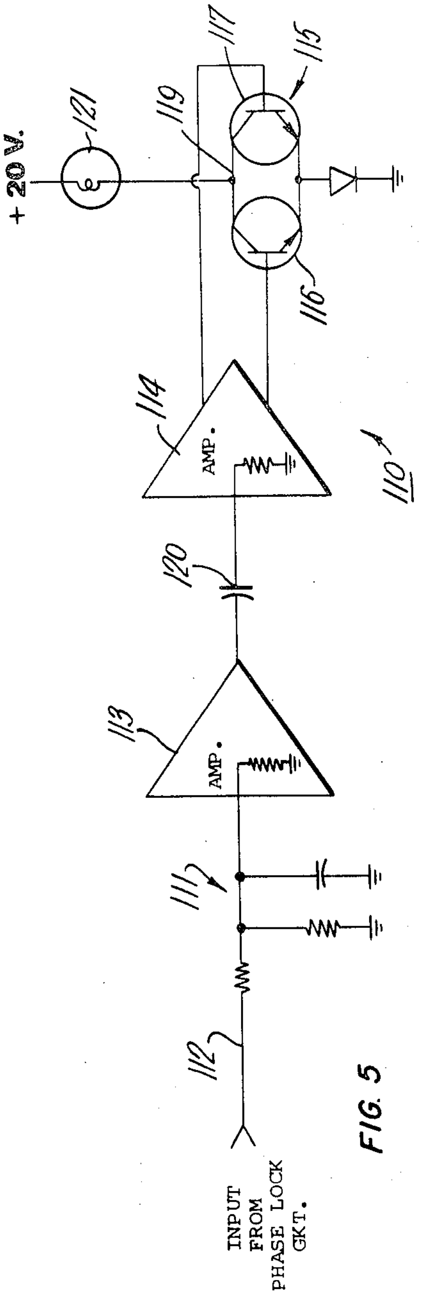
FIG. 5 is a schematic and block diagram of the phase-lock indicator circuit.

To indicate if the phase-lock has failed, a phase-lock failure indicator circuit 110, as shown in FIG. 5, is provided. The indicator circuit 110 consists of an R-C input network 111 connecting a signal from connection 112 of the frequency determining circuit 80, FIG. 3, to the input of a first amplifier 113. The output of amplifier 113 is connected by a capacitor 120 and further amplified by a second amplifier 114, the output of which is connected to a detecting circuit 115 consisting of transistors 116 and 117. The collectors of both transistors are interconnected at 119, which in turn connects to a B+ via an indicator lamp 121. When the comparator loop is in the unlocked condition, the feedback voltage is a large sawtooth at a frequency equal to that of skipping cycles between the two input signals, at 32 and 96, respectively, to the phase comparator 91. This feedback signal is connected to the frequency detecting circuit 80 (FIG. 3) of the oscillator 24 and fed to the input of the indicator circuit 110 where it is amplified and causes operation of the detecting circuit 115, causing a current to flow through indicator lamp 121 and indicate a failure.

In the event of a failure in the voltage controlled oscillator 24 or in the phase-lock network 22, the operation of the synthesizer 10 can be continued with reduced performance. In such a case these circuits, 22 and 24, are skipped over and the synthesized frequency is used directly. In order to be used the synthesized frequency has to be multiplied by 20. To do this an emergency multiplier circuit 130 (see FIGS. 2*b* to 6) is connected by changing over switch 103 of FIG. 4, from contacts A-B to A-C and also changing switch 104 of FIG. 3 from contacts A-B to A-C, so as to apply the output 131 of the emergency multiplier 130 to the voltage controlled oscillator buffer 83. In this mode of operation tuning accuracy is retained but the spurious level of the signal is impaired.

Figure 6:
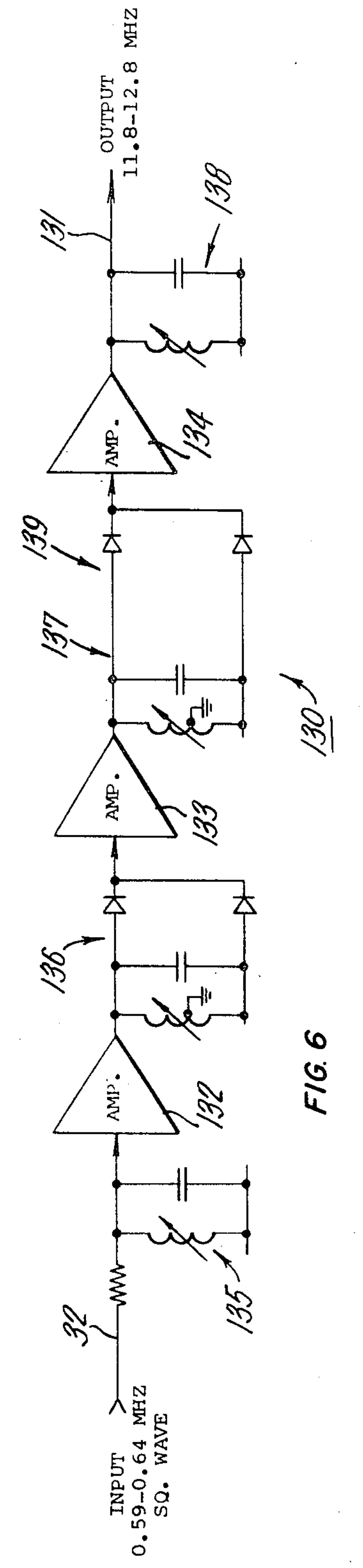
FIG. 6 is a schematic and block diagram of the emergency multiplier circuit.

Referring to FIG. 6, the frequency multiplier 130 consists of three basic amplifying stages 132, 133 and 134 providing X5, X2 and X2 multiplication, respectively. The signal located between 0.59 and 0.64 MHz at connection 32 from the output of controlled oscillator circuit 24 is connected to the input of the emergency multiplier 130. The signal is then connected to a tuned circuit 135 tuned for the fifth harmonic between 2.95 to 3.2 MHz, an amplifier 136, a second tuned circuit 136, tuned for 2.95 to 3.2 MHz, a second amplifier 133, a third tuned circuit 137 and amplitude limiter circuit 139, a third amplifier 134 and a fourth tuned circuit 138, and at output 131, where the signal, between 11.8 to 12.8 MHz, connects to the buffer 83 of the voltage control oscillator 24.

In the event of a failure in the frequency synthesizer network 10, the operation could still be maintained by opening the phase-lock loop and operating with the rough tuning of the voltage controlled oscillator. To do so, switch 103, see FIG. 4, is disengaged while switch 105 changed from A-B to A-C. The oscillator can now be tuned in 100 steps. Signal purity is normal but frequency accuracy and drift are degraded.

What is claimed is:

1. A frequency synthesizer for producing selected synthesized frequencies to support an associated receiver comprising means to generate a discrete frequency signal, generating circuit means adapted to derive from said discrete frequency signal a plurality of signals of different frequencies, circuit means responsive to a selection mechanism to rapidly select and generate from said signals of different frequencies a desired synthesized frequency, and a voltage controlled oscillator and phase-lock means associated with said oscillator to reduce frequency selection response time to provide a substantially exact output frequency derived from said desired synthesized frequency, said frequency selection mechanism further controlling the bias voltage of said voltage controlled oscillator to approximately tune it to said output frequency.

2. A frequency synthesizer as claimed in claim 1 wherein said means to generate is a frequency standard circuit having an oscillator generating a discrete frequency signal.

3. A frequency synthesizer as claimed in claim 1 wherein said generating circuit means include a plurality of frequency multiplier circuits, frequency dividing circuits and mixing circuits to produce a pre-selected fixed synthesized frequency for tuning the associated receiver.

4. A frequency synthesizer as claimed in claim 3 wherein said generating circuit means further provide discrete, pre-selected fixed frequencies for a reference frequency output, phase locking frequencies and auxiliary frequencies for IF conversion.

5. A frequency synthesizer as claimed in claim 1 wherein said circuit means comprises a plurality of matrix circuits adapted to receive two groups of pre-selected fixed synthesized frequencies from said generating circuit means and each of said matrix producing two selective outputs frequencies, said two selective outputs each being responsive to said frequency selection mechanism.

6. A frequency synthesizer as claimed in claim 5 wherein there is further provided six digit insertion stages controlled by said frequency selection mechanism via said matrix circuit to provide a choice of 1,000,000 output frequencies dependent on setting of decade mechanical switches of said frequency selection mechanism.

7. A frequency synthesizer as claimed in claim 1 wherein said frequency selection mechanism comprises rapid decade tuning switches for selecting the required synthesized frequency at the output of said generating circuit means, voltage dividing means for selecting a DC bias for said voltage controlled oscillator and control voltages for remote selection of a receiver frequency.

8. A frequency synthesizer as claimed in claim 1 wherein said voltage controlled oscillator consists of a frequency determining circuit to provide a stable signal output, a buffer circuit connected to said output signal, and a limiter circuit to provide a squared output signal.

9. A frequency synthesizer as claimed in claim 8 wherein said square output signal is connected to a filter to remove harmonic distortions therefrom to provide a first output, and further connected to a X10 frequency multiplier circuit to provide a second output and also connected to a digital frequency divider circuit to feed the phase-lock means.

10. A frequency synthesizer as claimed in claim 9 wherein said phase-lock means comprises a comparator circuit for comparing and locking the phase of a selected fixed synthesized frequency from said circuit means and a frequency from said voltage controlled oscillator, said phase locking being provided by a feedback DC voltage from said comparator.

11. A frequency synthesizer as claimed in claim 10 wherein there is further provided a phase-lock failure indicator circuit comprising visual indicating means operative in response to a predetermined variation of said DC voltage when said phase-lock fails.

12. A frequency synthesizer as claimed in claim 1 wherein there is further provided emergency operating means to provide operation during phase-lock or controlled oscillator failure.

13. A frequency synthesizer as claimed in claim 12 wherein said emergency operating means comprises a frequency multiplier circuit adapted to be connected between an output of a digit insertion network in said circuit means having the selected synthesized frequency and a buffer in said controlled oscillator circuit to retain the tuning accuracy of the synthesizer when said phase-lock has failed.

14. A frequency synthesizer as claimed in claim 13 wherein said frequency multiplier circuit comprises three multiplying stages of X5, X2 and X2, respectively.

15. A frequency synthesizer as claimed in claim 1 wherein there is further provided emergency operating means comprising switch means to disconnect the selected synthesized frequency output of said circuit means thereby providing for the voltage controlled oscillator to be tuned in the event of synthesized frequency failure.

16. A method of providing a synthesized group of frequencies to select therefrom a required tuning frequency to support an associated receiver comprising the steps of i. generating a discrete frequency signal,
ii. multiplying, dividing and mixing said discrete frequency signal to provide a plurality of signals of different frequencies,
iii. selecting a desired frequency from said plurality of signals of different frequencies,
iv. tuning a voltage controlled oscillator to approximately said required tuning frequency,
v. generating a further signal proportional to said selected synthesized frequency, and
vi. phase locking said further signal to said selected synthesized frequency to produce a substantially exact output frequency.

* * * * *